United States Patent [19]

Gentry et al.

[11] 4,060,371

[45] Nov. 29, 1977

[54] LIQUID OR GASEOUS FUEL FIRED BURNER

[75] Inventors: Charles B. Gentry, Grand Rapids; William A. Phillips, Comstock Park, both of Mich.

[73] Assignee: Granco Equipment, Inc., Grand Rapids, Mich.

[21] Appl. No.: 624,997

[22] Filed: Oct. 22, 1975

Related U.S. Application Data

[63] Continuation-in-part of Ser. No. 397,606, Sept. 14, 1973, Pat. No. 3,949,053.

[51] Int. Cl.² .......................................... B01D 53/34
[52] U.S. Cl. ................................... 431/75; 431/215
[58] Field of Search ............... 23/277 C; 110/8 A; 431/5, 11, 161, 207, 211, 212, 215, 216, 217, 75

[56] References Cited

U.S. PATENT DOCUMENTS

| 688,596 | 12/1901 | Cook | 431/5 X |
|---|---|---|---|
| 1,403,954 | 1/1922 | Herpin | 431/211 |
| 1,432,582 | 10/1922 | Will | 110/8 A |
| 1,561,966 | 11/1925 | Baker | 431/207 |
| 2,121,733 | 6/1938 | Cottrell | 110/8 A |
| 2,319,711 | 5/1943 | Van Almelo | 431/215 X |
| 2,486,481 | 11/1949 | Kissam | 431/215 X |
| 2,497,282 | 2/1950 | Waller | 431/215 X |
| 2,661,054 | 12/1953 | Hyatt et al. | 431/11 X |
| 3,524,632 | 8/1970 | Davies | 23/277 R X |
| 3,706,445 | 12/1972 | Gentry | 23/277 C X |

Primary Examiner—Alan Cohan
Assistant Examiner—Gerald A. Michalsky
Attorney, Agent, or Firm—McGarry & Waters

[57] ABSTRACT

An incinerator for combustible fumes in a mixture of such fumes and air wherein the fumes are raised to incineration temperature by combustion of a normally liquid fuel such as oil. The fumes and air mixture is first heated, preferably by heat exchange with the combustion chamber, to the vaporization temperature of the liquid fuel which is injected in atomized form into the heated fume and air mixture. The fume and air mixture along with the vaporized liquid fuel is then drawn through a fan which substantially homogeneously disperses the vaporized liquid fuel in the fume and air mixture and passes the homogeneous mixture to a combustion zone having a flame grid through which the liquid fuel-containing mixture passes. The liquid fuel in the mixture is ignited at the flame grid to form a flame curtain which raises the temperature of the fume and air mixture to incineration or oxidation temperature of the fumes. The fumes are thus oxidized and can thereafter be exhausted to the atmosphere. The liquid fuel is supplied with only sufficient air to atomize the same without the supply of additional air for combustion of the liquid fuel. Except for the air used in atomizing the liquid fuel, the oxygen for combustion of the liquid fuel is supplied solely by the air in the fume and air mixture, thereby avoiding the necessity of heating additional air required for burning the liquid fuel. Controls are disclosed for maintaining the temperature of the gases in the combustion chamber within a predetermined range by adjusting the amount of atomized liquid fuel added to the fume and air mixture. An auxiliary heating unit provides additional heat to the fume and air mixture when insufficient heat is provided by the heat exchange with the combustion chamber, such as during start-up of the incinerator unit. Controls are disclosed for maintaining the temperature of the fume and air mixture at a minimum temperature upstream of the combustion zone by controlling the operation of the auxiliary burner.

5 Claims, 4 Drawing Figures

LIQUID OR GASEOUS FUEL FIRED BURNER

CROSS-REFERENCE TO RELATED APPLICATIONS

This application is a continuation-in-part of Ser. No. 397,606 filed Sept. 14, 1973, now U.S. Pat. No. 3,949,053, for INCINERATION OF COMBUSTIBLE MATERIALS WITH LIQUID FUEL HEATING.

BACKGROUND OF THE INVENTION

1. Field of the Invention

This invention relates to fuel burning. In one of its aspects, the invention relates to a burner which can be fired with a normally liquid fuel, such as fuel oil, or a normally gaseous fuel.

2. State of the Prior Art

In the U.S. pat. Nos. to Gentry 3,706,445 and Phillips 3,670,668, there is disclosed and claimed an incinerator for oxidizing combustible fumes in a mixture of such fumes and air wherein the mixture is heat exchanged with the surface of the combustion chamber to preheat the mixture, the pressure of the mixture is increased in a fan and the mixture is thereafter passed through the combustion chamber wherein the temperature thereof is further raised to an oxidation temperature for the fumes. A flame grid, for example, of the nature described in U.S. Pat. No. to Davies 3,524,632, can be used to raise the temperature of the mixture to the oxidation temperature of the fumes. The flame grid disclosed by Davies is in the nature of a plate having openings for passage of gases therethrough and providing a plurality of protected areas to support combustion thereon. Gaseous fuel is supplied to the protected areas and combustion is initiated thereon so that a flame curtain extends substantially across the plate. The gases passing through the flame curtain come into substantial contact with the fumes to uniformly heat the gases and to provide intimate mixing between the fumes and the combustion zone. The grid system thus maximizes the oxidation of the fumes. The gaseous fuel supplied to the grid is advantageous to the fume incinerator because it can be supplied in gaseous form without the need for addition of external secondary air required for combustion of the fuel. The secondary air is obtained from the air in the mixture of the fumes and air.

The absence of supplying the external secondary air is an important economic consideration in the operation of an incinerator of this type. Use of external or outside fresh air as secondary air for combustion means that additional BTU's must be used to raise the temperature of the fume and air mixture to the incineration temperature which may be 1200°-1400° F. The air added to the system must also be raised to these temperatures by the burning. Thus, considerable savings are afforded by virtue of the fact that no additional air is required to be added to burn the fuel.

Recently, supply of natural gas has been short, particularly during periods of peak use. New applications for use of natural gas for industrial sources have been denied or delayed because of the tight supply. In addition, industry use of natural gas during peak periods has been limited because of typical bulk-rate contract provisions. It is therefore necessary that other sources of energy be available in incinerators of this type.

Liquid fuel, such as industrial heating oil, is suitable for use in industrial incineration. However, such a fuel cannot be readily substituted for natural gas in natural gas burners, such as disclosed in the Davies patent. Liquid fuels, such as oils, require special systems for supplying the fuel to a combustion chamber. Normally, the fuel is required to be atomized and mixed with sufficient secondary air for burning. However, use of conventional oil burners with additional secondary air would add considerable cost to the incineration process because of the heating expense for the external air used in burning. Further, the liquid fuel, in atomized form or otherwise, cannot be simply forced through the gas burner because the flow parameters are different from the oil and gas systems.

Normally, a mixture of fumes and air cannot be used in heated form as the secondary air supplied to a conventional oil burner. The fumes, as for example from a drying oven, contain resins and similar materials which would be likely to deposit on the rotor blades of blowers and on ports of the burners at low temperatures, resulting in malfunction of the burner. Further, the oil burners are normally operated at a low temperature and the heated air would not work in such conventional burners. Special burners would have to be designed for use in these types of incinerator systems.

Hardison et al., U.S. Pat. No. 3,484,189, disclose an apparatus for mixing fuel with a fume and air mixture without the addition of secondary air. Hardison et al. introduce fuel into the central portion of a frusto conical mixture having a plurality of openings through which air passes for mixing with the fuel. The fuel used in the system apparently is a gaseous fuel and combustion is initiated as the fuel is introduced into the frusto conical mixture. In this system, only a portion of the contaminated air mixes with the fuel and the remainder of the gases bypass the combustion zone. The possibility exists that some of the fumes may not be heated sufficiently for oxidation of the fumes. As stated above, oxidation of the fumes is more certain when the fumes are passed through a flame front or flame curtain which heats the fumes to an oxidation temperature.

SUMMARY OF THE INVENTION

According to the invention, a burner for heating gases to an elevated temperature for firing burners for heating furnaces and for oxidizing combustible fumes is provided wherein means are provided for firing the burner interchangeably with liquid or gaseous fuel without the need for separate combustion systems to vaporize the liquid fuel.

According to the invention, the burner has a combustion chamber for burning fuel, the combustion chamber including a gas burner and means for supplying normally gaseous fuel to the gas burner. A feed conduit communicates with the combustion chamber for passing an oxygen-containing gas to the gas burner. Means are provided for heat exchanging the oxygen-containing gas in the feed conduit with the hot exhaust from the combustion chamber to raise the temperature of the oxygen-containing gas above the vaporization temperature and below the preignition temperature of the liquid fuel. A source of fuel, which is liquid at ordinary temperature and pressure, is coupled to means for injecting the liquid fuel into the feed conduit downstream from the heat exchange means so that the normally liquid fuel is vaporized as it is injected into the feed conduit. Means in the feed conduit are provided between the injecting means and the gas burner for turbulating the gases in the feed conduit to evenly disperse and admix the vaporized normally liquid fuel with the oxygen-containing gas.

Means are provided for igniting the vaporized fuel at the gas burner so that the vaporized liquid fuel is burned at the gas burner.

In a preferred embodiment, the gas burner provides a flame grid and the vaporized liquid fuel with the oxygen-containing gas is passed through the flame grid.

Desirably, the injecting means includes an atomizing means for injecting the normally liquid fuel into the feed conduit in atomized form.

The turbulating means can be a fan in the feed conduit downstream of the injecting means or can be turbulating conduits which disperse and admix the vaporized fuel into the oxygen-containing gas.

In one embodiment, means are provided to sense the temperature of the combusted gases and means are provided to control the supply of the liquid fuel to the feed conduit in accordance with the temperature sensed by the temperature sensing means in the combustion zone.

Further according to the invention, a method is provided for firing a burner with a fuel which is normally liquid at ordinary temperatures and pressures. According to the invention, an oxygen-containing gas is heat exchanged with the hot combustion gases from a combustion zone to preheat the oxygen-containing gas to a temperature above the vaporization temperature of the liquid fuel. The liquid fuel is then injected into the preheated gas to vaporize the liquid fuel. The vaporized fuel — preheated gas mixture is then turbulated to disperse the fuel evenly and uniformly in the gas upstream from the combustion chamber. The turbulated mixture is then passed to a combustion zone wherein it is ignited to fire the burner. Preferably, the injecting step includes atomizing the liquid fuel.

The invention is useful in incineration of fumes in a mixture of fume and air wherein the fume and air mixture is heat exchanged with the exhaust from the combustion chamber. Further, the invention is useful in other types of furnaces wherein the hot combustion gases are used to heat a furnace, which may be a drying oven, a billet furnace, or a soaking furnace. In the case of the furnaces or drying ovens, the combustion gases are first passed through the furnace and are heat exchanged with the oxygen-containing gas for the burner after passing through the furnace or drying oven.

Desirably, the fumes and air mixture is heated by heat exchange with the hot gases in the combustion zone. An auxiliary burner is provided to supply additional heat to the fumes and air mixture when there is insufficient heat transferred from the combustion zone to heat the fume and air mixture up to the vaporization temperature of the liquid fuel. Heat supplied by the auxiliary burner is controlled to maintain a minimum temperature of the fumes and air mixture upstream of the combustion zone.

The amount of liquid fuel supplied to the fumes and air mixture is controlled in accordance with the temperature in the combustion zone to maintain the temperature therein within a predetermined temperature range.

BRIEF DESCRIPTION OF THE DRAWINGS

The invention will now be described with reference to the accompanying drawings in which.

DETAILED DESCRIPTION OF THE PREFERRED EMBODIMENT

Figure 1:
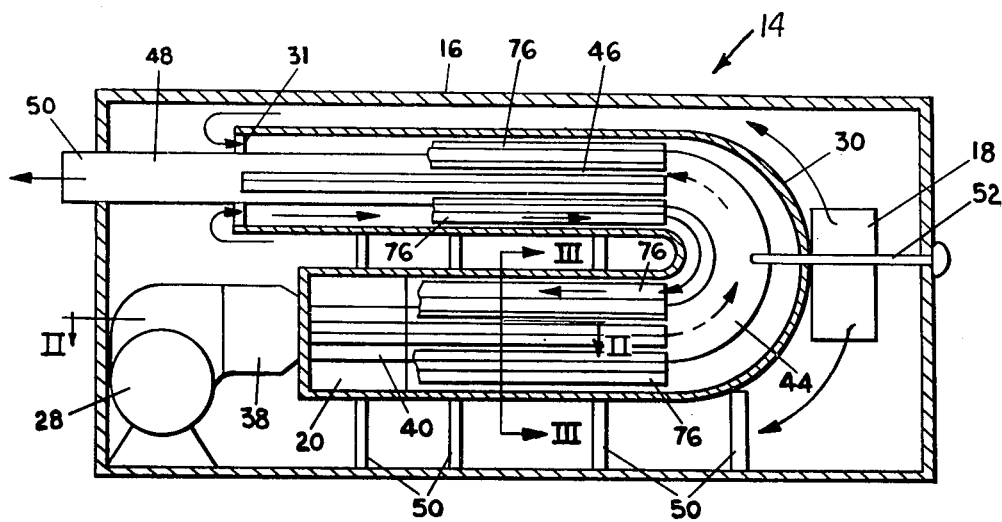
FIG. 1 is a side elevational view in section of an incinerator unit according to the invention.
Figure 3:
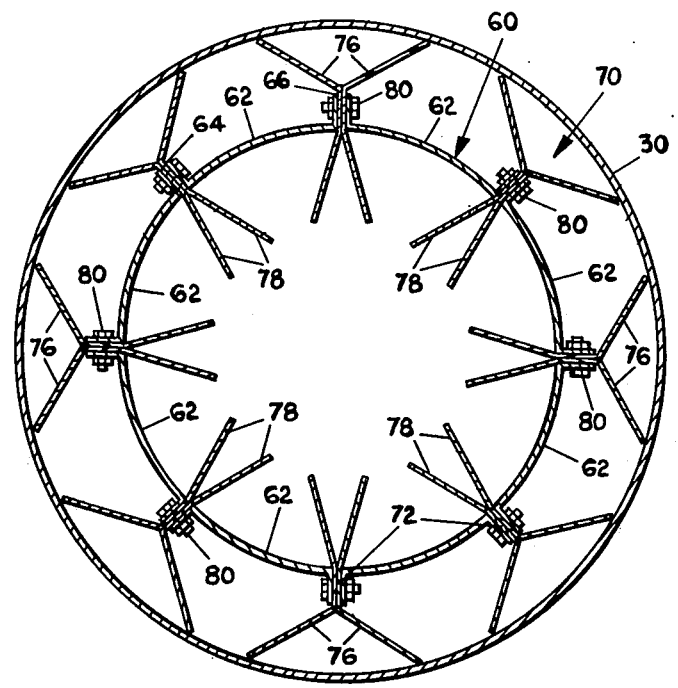
FIG. 3 is a partial sectional view taken along lines III—III of FIG. 1.
Figure 2:
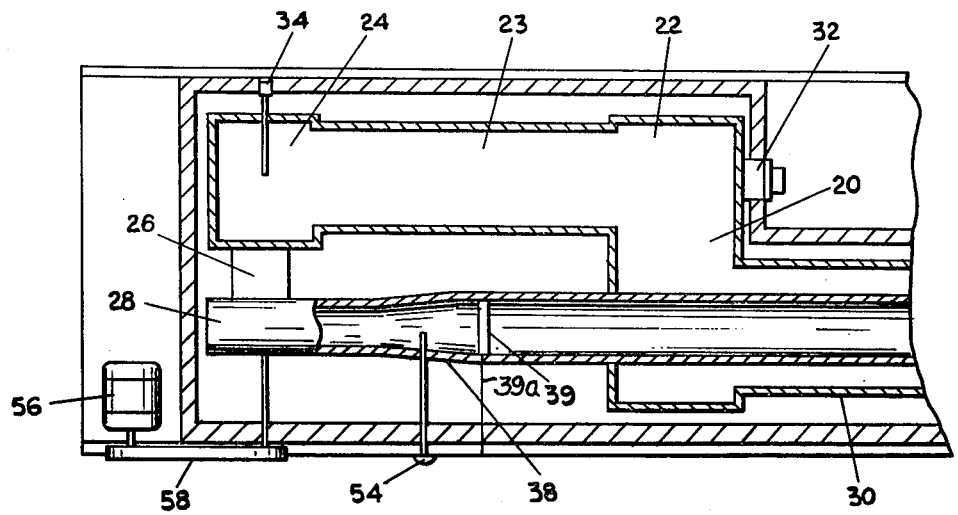
FIG. 2 is a partial sectional view taken along lines II—II of FIG. 1.

Referring now to the drawings, and to FIGS. 1-3 in particular, there is illustrated an incinerator unit generally designated by the numeral 14 and formed of an outer housing 16 of insulating material with a fume inlet opening 18 in the sides thereof. The opening 18 is connected to a drying oven (not shown) or to other sources of combustible fumes to be incinerated.

A U-shaped outer tube 30 is mounted within the housing 16 and has an upper open end communicating with the interior of the housing. The lower end of the U-shaped outer tube 30 communicates with the inlet of a fan 28 through cross-duct 20, preheat chamber 22, duct 23, fuel injection chamber 24 and inlet duct 26. Thus, the U-shaped outer tube 30 communicates at one end with the inlet opening 18 and at the other end with the fan inlet duct 26.

A motor 56 is provided exteriorly of the housing 16 and drives the fan 28 through a conventional pulley system including a belt 58.

An oil burner 32 is positioned within the preheat duct 22 for heating gases passing therethrough as desired. A fuel injection tube or nozzle 34 projects into the fuel injection section 24 to directly inject atomized liquid fuel therein for admixture with the heated gases passing therethrough. Support members 50 are provided in suitable spaced locations within the housing 16 to securely retain the outer tube 30 in the desired position illustrated in the drawings.

Mounted within the U-shaped outer tube 30 is a U-shaped incinerator tube formed of a first burner tube section 40, a U-bend section 44, and a straight upper section 46. The annular area within the U-shaped outer tube 30 approximates the area within the burner tube formed by sections 40, 44 and 46. Gases from this incinerator tube are exhausted from section 46 through an exhaust conduit 48. The incinerator tube section communicates with a cylindrical duct 38 which contains a suitable flame grid 39. Means (not shown) such as a spark plug or pilot light are provided for igniting the fuel and air mixture at the downstream side of the grid 39. A suitable grid is illustrated in U.S. Pat. No. 3,524,632 to Davies, which patent is incorporated herein by reference. In the Davies burner, fuel is supplied behind the flame grid to support combustion at the downstream side of the grid. The flame grid 39 of the present invention can be of similar structure to that shown in the Davies patent except that combustible fuel is not supplied behind the grid in accordance with the invention in order to oxidize the fumes in the mixture of gases. However, a pilot burner may be provided to initiate combustion of the fuel and fume-laden gases on the downstream side of the flame grid 39. The flame grid may be provided with a source of natural gas for firing the grid through line 39a when gas is available.

The lower incinerator tube section 40 and the upper straight section 46 are preferably formed from elongated metal burner tube panel 60, best illustrated in FIG. 3. Each elongated panel 60 is formed from an elongated arcuate portion 62 with backwardly bent flanges 64 and 66. Holes are provided in spaced locations along flanges 64 and 66.

Heat exchange fins 70 extend between the interior of the incinerator tube sections 40 and 46 and the annular preheat area between the incincerator tube and the outer U-shaped tube 30. Such fins are of high heat conducting metal and comprise a central portion 72 having spaced therealong a plurality of holes, an outer fin 76 and inner fin 78. As illustrated in FIG. 3, bolts 80 extend through the holes in the flanges 64 and 66 and through holes in the heat exchange fins 70 to secure the heat exchange fins in place and to secure the burner panels together. Thus, the burner panels are bolted together with the heat exchange fins extending therebetween. The outer heat exchange fins 76 act as spacers between the burner tube and the U-shaped outer tube 30.

The inner fins 78 extend into the incinerator tube as far as possible to maximize heat transfer of the annular preheat area. Desirably, the fins 78 extend ⅓ to ½ of the radial distance between the burner panels 60 and the center of the incinerator tube.

A thermocouple 52 extends into the U-bend section 44 to sense the temperature of the hot gases therein and to control the fuel supply to the incinerator in a manner which will be described later. A second thermocouple 54 extends into the duct 38 upstream of the burner 39 to sense the temperature of the hot gases therein and to control the preheat burner 32 in a manner to be described later.

Figure 4:
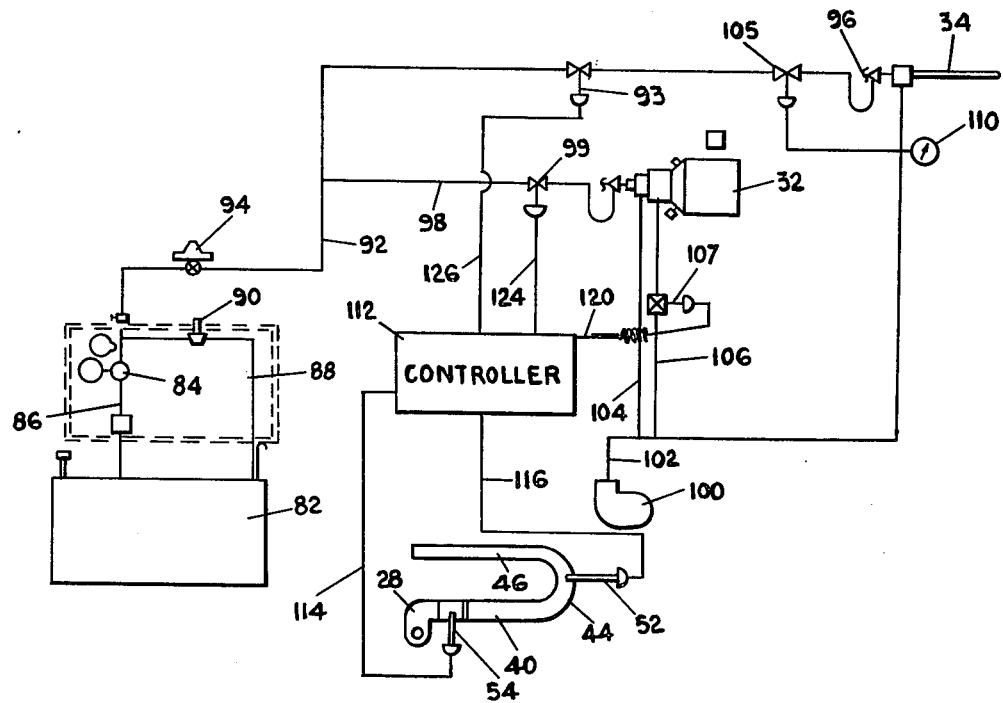
FIG. 4 is a schematic diagram of the fuel and air supply systems for the incinerator unit.

The fuel and air supply system is illustrated in FIG. 4 to which reference is now made. An oil storage tank 82 contains liquid fuel such as heating oil. A pump 84 in a line 86 draws the oil from the oil tank 82 and feeds the same to an atomizer 96 through line 92. A regulator 94 is provided in line 92 to regulate the pressure of the oil passing to the atomizer 96. The flow of oil through line 92 is controlled by control valve 93. A conventional return line 88 having a pressure relief valve 90 is provided to return the oil to the storage tank 82 in the event that the oil pressure in the line 94 upstream of the regulator 94 exceeds a predetermined value. A line 98 supplies fuel from line 92 to the oil burner 32 which can be of any suitable well-known burner construction which atomizes oil and then burns the atomized oil with air supplied under a moderate pressure. A control valve 99 in line 98 controls the flow of oil therethrough.

An air blower 100 supplies air through a line 102 to the atomizer 96 and to the oil burner 32. To this end, a branch line 104 is provided to supply a small amount of air to the burner 32 for atomization of the oil, and a second line 106 supplies air to the burner 32 for combustion purposes. Suitable air and fuel supply lines (not shown) can also be provided for supplying fuel to the burner 32 for a pilot flame therefor. A control valve 107 in line 106 controls the flow of air therethrough.

The air in line 102 passes through a pressure switch 110 and to the atomizer 96. The air supplied to the atomizer 96 is sufficient only to atomize the oil or liquid fuel therein and to move the thus atomized oil through tube 34 and into the fuel injection chamber 24. The pressure switch is connected to a safety valve 105 to cut off the flow of fuel to the atomizer 96 in the event the air pressure in line 102 is insufficient to support atomization.

A controller 112 is electrically coupled to the thermocouple 54 through lead line 114. In like manner, lead lines 116, 120, 124 and 126 electrically couple the controller 112 to the thermocouple 52, valve 107, valve 99 and valve 93 respectively. The controller 112 analyzes the signal from the thermocouple 54 and adjusts the flow of fuel and air to the burner 32 by adjusting valves 99 and 107 to maintain the temperature of the preheated air and fumes at the entrance to the burner above the vaporization temperature of the liquid fuel. For common grades of fuel oil, for example No. 2 oil, the vaporization temperature is above 600° F. The controller also throttles the flow of fuel and air through valves 99 and 107 as the temperature of the gases rises significantly above the fuel vaporization temperature. After start-up is completed, controller 112 stops the flow of oil to the fuel injection tube 34 if the temperature of the preheated air and fumes in duct 58 rises above the ignition temperature of the oil and fumes in the mixture.

The controller 112 receives signals from the thermocouple 52 related to the temperature of the gases in the combustion zone within U-bend section 44. The controller 112 controls valve 93 to regulate the supply of fuel injected through injection tube 34 so that the temperature of the gases in the combustion zone stays within a predetermined range. Such temperature range for most industrial solvent fume incinerators will be between 1200°–1600° F.

In operation, solvent and air mixture at about 300°–400° is drawn from a drying or baking oven or other suitable source of combustible fumes through opening 18 and around the outside of the U-shaped outer tube 30. The combustion gases are then drawn into the intake end 31 of the U-shaped tube 30, passing through the annular space between the outer tube 30 and the incinerator burner tube formed by straight section 46, the U-bend section 44, and the incinerator tube section 40. While passing through the annular space, these gases will contact the hot surface of these tubes and will also contact the outer fins 76 of the heat exchange fin 70. Contact between the gases and the hot surfaces preheats the gases as they pass through the annular space, the temperature reaching about 800° F. by the time the gases reach the fan 32. The U-bend in the tube 30 has a turbulating effect on the gases passing through the annular space which further increases the transfer of heat from the hot surfaces to the gases and provides more effective mixing of the gases for more complete incineration.

The preheated gases are then drawn through the crossduct 20, preheat chamber 22, conduit 23, through fuel injection chamber 24 and into inlet duct 26 of the fan or blower 28. Atomized liquid fuel, such as oil, is injected into the hot gases through the injection tube 34 and thoroughly mixes therewith as the gases pass through fan 28 and into the 38. At the 800° temperature the injected fuel is not self-combustible with the air. As the gases pass through the flame grid 39, the fuel in the mixture is ignited by the flames and burns with the oxygen in the gases, thereby heating the gases to a temperature of about 1400° F. At this temperature the fumes in the gases oxidize substantially completely to carbon dioxide and water. The gases then pass through the burner tube and out through the exhaust conduit 48.

During the initial start-up of the incinerator, the burner tube will be relatively cool and will not have sufficient heat to raise the temperature of the fume-laden gases passing through the annular space within the U-shaped outer tube 30 to the required 600°–800° F. temperature. The fume-laden gases should be this hot to vaporize the atomized oil. During this initial start-up period, the preheat oil burner 32 is fired to heat the gases to the desired temperature. As the burner tube becomes hot and transfers the heat to the incoming gases, the oil burner 32 is cut back by controller 112 until the gases are heated completely by heat exchange with the burner tube. The preheat oil burner 32 is then cut off and the operation takes place without it.

The temperature of the preheated fuel-air-fume mixture must be maintained below the preignition temperature of the fuel in the mixture upstream of the flame grid. In the event that the burner 32 is completely shut off, the heat for preheating the fume-laden gases is supplied solely by heat exchange with the burner tubes 40, 44 and 46. The temperature of the preheated gases can be controlled by the fuel injected through injection tube 34. In other words, if the preheated gases temperature is too low, the temperature in the combustion zone as sensed by thermocouple 52 is likely to be too low. Thus, additional fuel will be supplied to the preheated gases through injection tube 34 and the temperature of the gases in the combustion zone will increase. More heat will thus be transferred to the incoming gases through heat exchange with the hotter combustion gases.

The incineration structure according to the invention provides an efficient system which can operate with liquid or gaseous fuel. If gaseous fuel is available, it can easily be supplied directly to the flame grid 39 in a conventional manner and the liquid fuel is not used. If the gaseous fuel is not available, the liquid fuel is supplied through injector tube 34 and the gaseous fuel is not used except for pilot purposes. The system is easily switched between liquid and gaseous fuel. The efficiencies of both systems are about equal except for the vaporization energy of the liquid fuel. The apparatus of this invention achieves this versatility with a minimum of expense.

Reasonable variation and modification are possible within the foregoing disclosure, the drawings, and the appended claims without departing from the spirit of the invention.

The embodiments of the invention in which an exclusive property or privilege is claimed are defined as follows:

1. A burner which can be fired by gas or oil without the use of secondary air for an oil burner, the burner comprising:

a combustion chamber for burning fuel, said combustion chamber including a gas burner;

means for supplying normally gaseous fuel to said gas burner;

a feed conduit communicating with said combustion chamber for passing oxygen-containing gas to said gas burner;

means for heat exchanging the oxygen-containing gas in said feed conduit with the hot exhaust from said combustion chamber to raise the temperature of said oxygen-containing gas above the vaporization temperature and below the preignition temperature of a liquid fuel;

a source of fuel which is liquid at ordinary temperature and pressure;

a means for injecting the liquid fuel directly into the feed conduit downstream of the heat exchange means so that the normally liquid fuel is vaporized as it is injected into the feed conduit;

means in the feed conduit between the injecting means and the gas burner for turbulating the gases in the feed conduit to evenly disperse and admix the vaporized normally liquid fuel with the oxygen-containing gas; and means for igniting the vaporized fuel at the gas burner.

2. A burner according to claim 1 wherein said gas burner provides a flame grid across the entrance of said combustion chamber.

3. A burner according to claim 1 wherein said injecting means includes means for atomizing said liquid fuel.

4. A burner according to claim 1 wherein said turbulating means is a fan between said injection means and said combustion chamber.

5. A burner according to claim 1 and further comprising means to sense the temperature of said combusted gases in said combustion chamber; and means to control the supply of said liquid fuel to said feed conduit in accordance with the temperature sensed by said temperature sensing means in said combustion chamber.

* * * * *